J. B. MUNSON & P. F. HAGERTY.
PORTABLE TRACK AND TIRE PROTECTOR.
APPLICATION FILED AUG. 7, 1916.
1,215,301.
Patented Feb. 6, 1917.
2 SHEETS—SHEET 1.
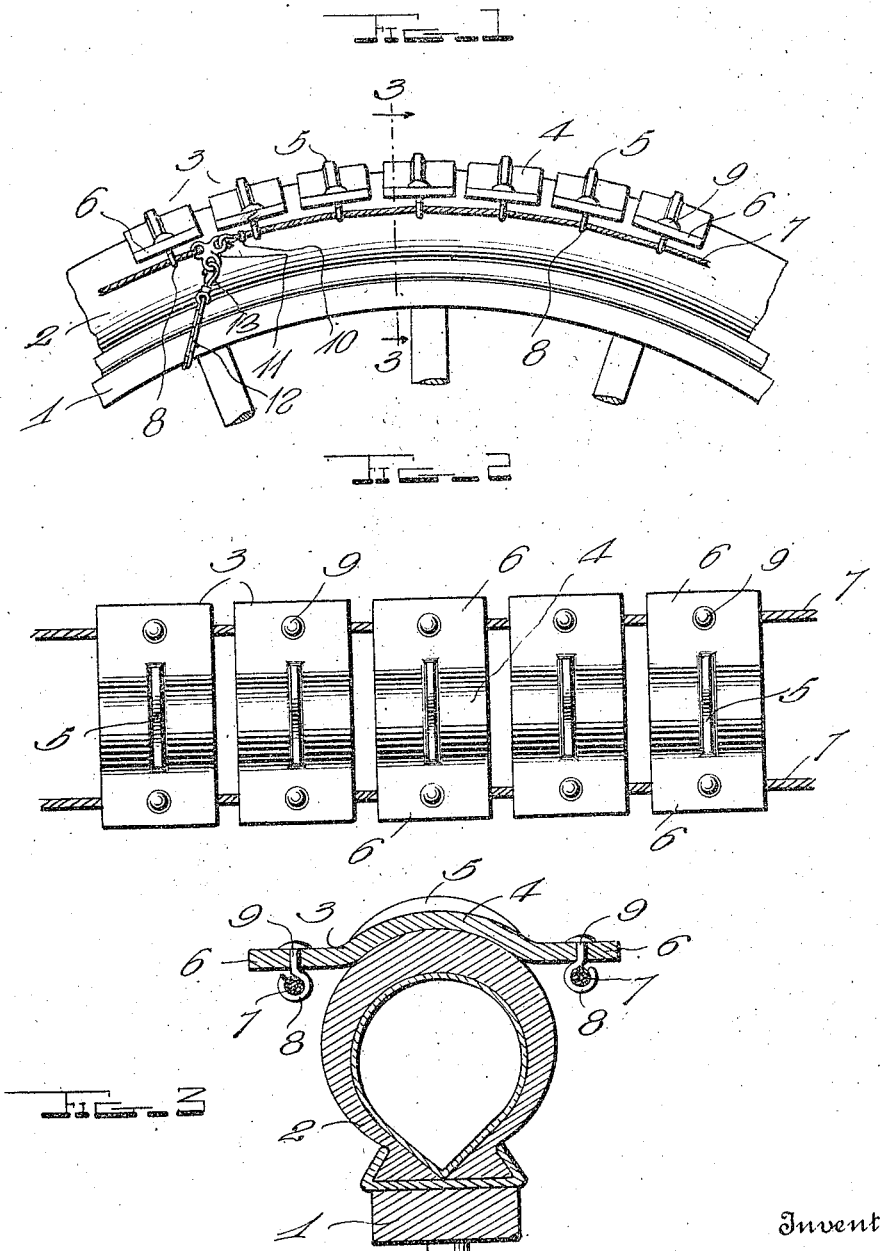
Inventors
John B. Munson
Peter F. Hagerty

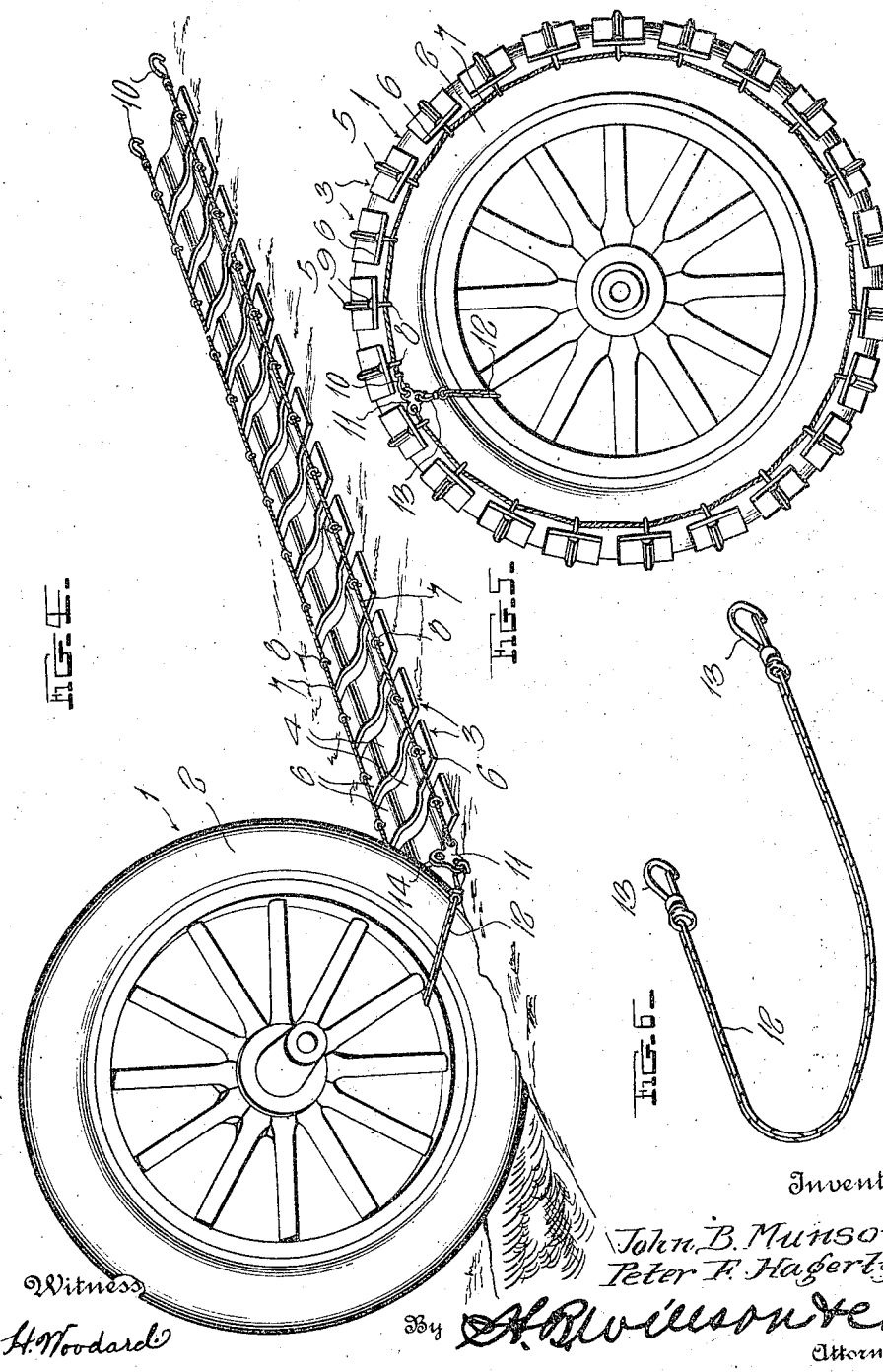

UNITED STATES PATENT OFFICE.

JOHN B. MUNSON AND PETER F. HAGERTY, OF PHILLIPSBURG, NEW JERSEY.

PORTABLE TRACK AND TIRE-PROTECTOR.

1,215,301.   Specification of Letters Patent.   Patented Feb. 6, 1917.

Application filed August 7, 1916. Serial No. 113,673.

*To all whom it may concern:*

Be it known that we, JOHN B. MUNSON and PETER F. HAGERTY, citizens of the United States, residing at Phillipsburg, in the county of Warren and State of New Jersey, have invented certain new and useful Improvements in Portable Tracks and Tire-Protectors; and we do declare the following to be a full, clear, and exact description of the invention, such as will enable others skilled in the art to which it appertains to make and use the same.

This invention relates to traction devices and tire protectors adapted to form a part of motor vehicle equipment, and has for its primary object the provision of a device adapted to assist a motor vehicle, operating under its own power, to climb out of snow drifts, mires or ditches in which the same may have become stalled.

Another object is to provide a track which may, after assisting the vehicle to climb out of a mire, be used as a tire protector and anti-slipping device.

With these and numerous other objects in view, our invention consists of the novel features of construction, combination and arrangement of parts to be hereinafter more fully described in the specification and claim.

Referring to the drawings:

Figure 1 is a side elevation of a portion of the vehicle wheel and tire showing our protector applied thereto;

Fig. 2 is a plan view of a portion of the protector;

Fig. 3 is a transverse section taken on the line 3—3 of Fig. 1;

Fig. 4 is a perspective view illustrating one of the ways in which the invention may be used;

Fig. 5 shows a side elevation of a motor vehicle wheel with the protector applied thereto; and, Fig. 6 is a view of the attaching chain used with our device.

In describing our invention, we shall refer to the drawings in which similar reference characters designate corresponding parts throughout the several views and in which the numeral 1 designates a vehicle wheel, upon the rim of which is mounted a tire 2. This device is adapted to be used in connection with the various types of vehicle wheels, the size being varied according to the size of the tread of the tire. The device is equally applicable to either pneumatic or solid tires, as the same not only is a portable track for assisting the vehicle out of mires, but is adapted for use as a tire protector and anti-slipping device.

The track proper comprises a plurality of steel sections 3 which are circumferentially spaced around the tire 2, when used as a protector, and which are disposed with their edges a short distance from each other, so that when the device is in position, full protection will be afforded the tire. There will be very little space between the adjacent edges of each section, so that when the device is used in traveling through mud or sand, a minimum space will be afforded for the material to pass through. This will afford a traction surface for the wheels, so that when the device is applied they may be used where ordinarily the vehicle could not travel.

Each steel section 3 has a curved inner face 4, which is adapted to fit the tread of the tire 2 as clearly shown in Fig. 3 of the drawing. The outer surface of the section is provided with an exteriorly projecting rib 5 is curved transversely with respect to the tire, and extends substantially across the curved surface of the section.

The sections are provided with laterally projecting sides or wings 6, that extend any desired distance from the sides of the tire. These sides are formed integral with the sections, and project laterally therefrom to afford the traction surface for the wheel. They may be made of any size most advantageous to perform this function. The size is regulated according to the type of the tire to which the device is to be applied.

The sections 3 are secured to the tire of the wheel by a pair of flexible connections, which are preferably wire cables 7, which extend circumferentially adjacent the sides of the tire and are secured to the inner surface of the sides 6 of the sections, by fastening loops 8, which have shank portions 9 riveted to the sides. The loops 8 have open ends, so that the cables may be held positioned in the loops, and the ends bent back so that the cables will be securely held therein. The extremities of the cables 7 are provided at one end with snap fasteners 10, while the other have apertured fastening plates 11 thereon, adapted to receive the fasteners. This detachable fastening means enables the ends of the cables when positioned around the tire to be secured together to prevent the sections from slipping therefrom.

For the purpose of securing one end of the track to the wheel when it is desired to assist a vehicle out of a mire, we have provided a chain 12, having a hook 13 on each end to be releasably engaged with the plates 11 through apertures 14 therein.

When the track has been fastened to the wheel in the above stated manner, it is then stretched out in front of said wheel after which the power is applied and the wheel is guided up the curved inner faces 4 of the sections 3. As the wheel rolls upon the track, the latter is wound around the wheel and attains a position whereby the hooks 10 and plates 11 on the ends of the cables 7 may be easily engaged as shown in Fig. 1. When in position, the sections are spaced closely together to afford ample protection for the tire, and a traction surface for the same. The projecting rib on each section affords an additional gripping means when the device is used in traveling through sand and mud.

Owing to the fact that the different sections are loosely connected, this device may be rolled in a small compact bundle when not in operation, and may be easily stored. The sections are made of thin steel sheets pressed to the desired shape, and the curvature 4 is made according to the type of tire to which it is applied. The depth of the same is optional, although it is found most advantageous when the device is to be used, for traction purposes to have the curvature of a comparatively shallow depth, so that the laterally projecting sides will be disposed only a short distance below the outermost point of the same.

From the foregoing description of the construction and operation of our tire protector, the manner of applying the same to use and the operation thereof will be readily understood, and it will be seen that we have provided a simple and efficient device for carrying out the objects of this invention.

We claim:—

A tire armor comprising a plurality of transversely arranged plates with recesses on their inner faces adapted to engage the tread of a tire, wings carried by the outer ends of said plates and projecting laterally from opposite sides of the tire, said wings having centrally disposed openings therethrough, rivets in said openings with enlarged heads disposed on the outer surface of each wing, the inner ends of said rivets extending beyond the inner surface of each wing and being bent to form alining eyes, a pair of flexible cables positioning one on each side of the tire and extending through said eyes, and means for connecting the ends of the cables to retain the plates in position.

In testimony whereof we have hereunto set our hands in the presence of two subscribing witnesses.

JOHN B. MUNSON.
PETER F. HAGERTY.

Witnesses:
BESS H. RUBERT,
WILMOT B. EILENBERGER.